(12) United States Patent
Yoshihara et al.

(10) Patent No.: US 9,987,660 B2
(45) Date of Patent: Jun. 5, 2018

(54) COATED ARTICLE HAVING HAIRLINE PATTERN AND METHOD OF PRODUCING THE SAME

(71) Applicant: KABUSHIKI KAISHA TOSHIBA, Minato-ku, Tokyo (JP)

(72) Inventors: Keisuke Yoshihara, Tokyo (JP); Hikaru Hirata, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 205 days.

(21) Appl. No.: 14/724,595

(22) Filed: May 28, 2015

(65) Prior Publication Data

US 2016/0144399 A1 May 26, 2016

Related U.S. Application Data

(60) Provisional application No. 62/083,469, filed on Nov. 24, 2014.

(51) Int. Cl.
| | | |
|---|---|---|
| *B32B 3/00* | (2006.01) | |
| *B05D 5/06* | (2006.01) | |
| *G06F 1/16* | (2006.01) | |
| *B05D 5/02* | (2006.01) | |

(52) U.S. Cl.
CPC ............ *B05D 5/061* (2013.01); *B05D 5/067* (2013.01); *G06F 1/1616* (2013.01); *B05D 5/02* (2013.01)

(58) Field of Classification Search
CPC ........... B05D 5/061; B05D 5/067; B05D 5/02
See application file for complete search history.

(56) References Cited

U.S. PATENT DOCUMENTS

| | | | | |
|---|---|---|---|---|
| 6,331,326 B1* | 12/2001 | Tsunoda | ................ | B05D 5/067 106/403 |
| 6,544,588 B2* | 4/2003 | Yamamori | ............ | B05D 5/067 427/261 |
| 8,115,692 B2* | 2/2012 | Nakano | ................ | G06F 1/1616 343/700 MS |
| 8,668,965 B2* | 3/2014 | Kasperchik | ............ | B42D 15/00 106/31.65 |
| 8,993,219 B2* | 3/2015 | Richert | .................... | B41M 7/00 430/1 |
| 2013/0288024 A1* | 10/2013 | Clauter | .................... | B44C 1/24 428/201 |

FOREIGN PATENT DOCUMENTS

| | | |
|---|---|---|
| JP | 10-071677 A | 3/1998 |
| JP | 2002-045785 A | 2/2002 |

* cited by examiner

*Primary Examiner* — Elizabeth E Mulvaney
(74) *Attorney, Agent, or Firm* — Knobbe, Martens, Olson & Bear, LLP

(57) ABSTRACT

According to one embodiment, a coated article having a hairline pattern includes a base member having at least its surface region formed of a resin. A surface of the base member has a hairline pattern. A resin layer containing powder of a brilliant material in a resin is provided on the surface of the base member having the hairline pattern.

13 Claims, 2 Drawing Sheets

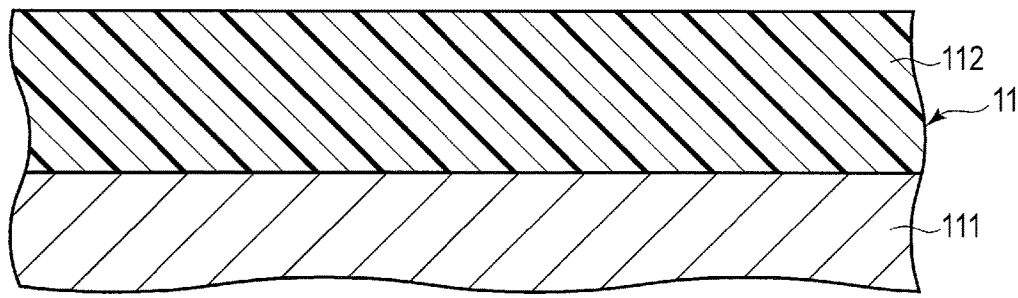
F I G. 1A
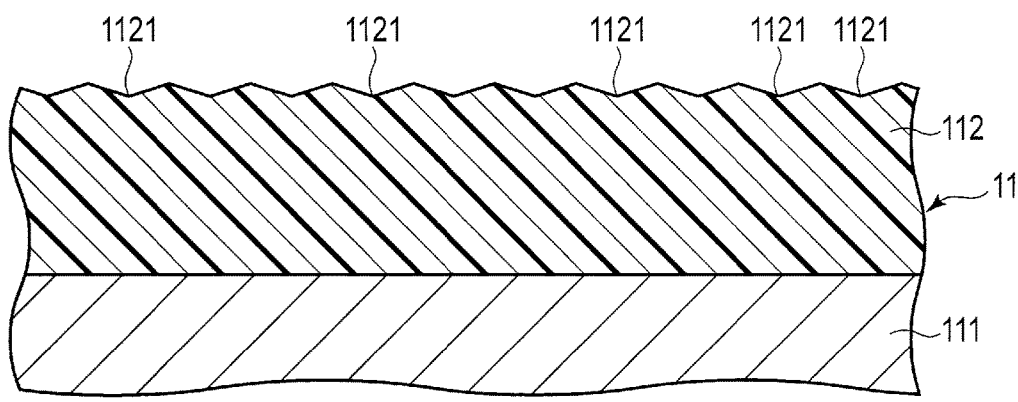
F I G. 1B
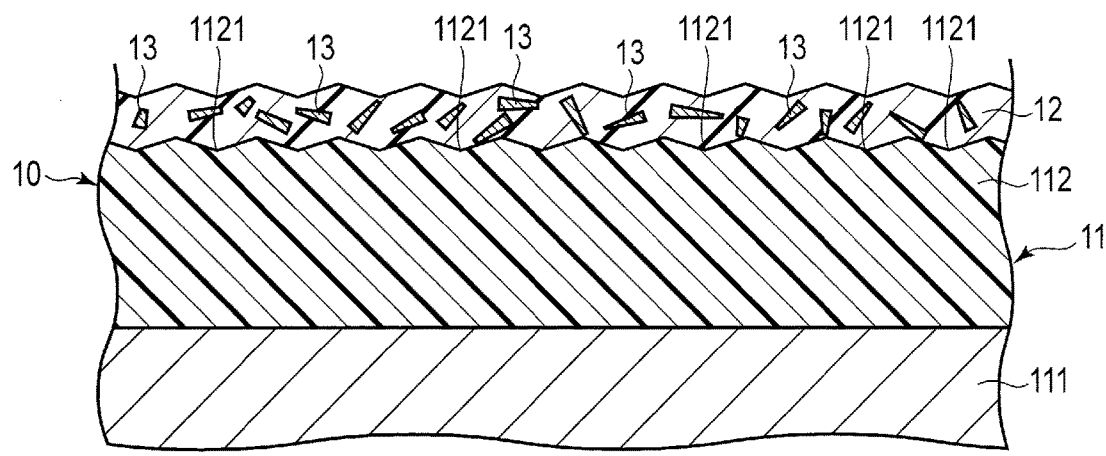
F I G. 1C

COATED ARTICLE HAVING HAIRLINE PATTERN AND METHOD OF PRODUCING THE SAME

CROSS-REFERENCE TO RELATED APPLICATIONS

This application claims the benefit of U.S. Provisional Application No. 62/083,469, filed Nov. 24, 2014, the entire contents of which are incorporated herein by reference.

FIELD

Embodiments described herein relate generally to a coated article having a hairline pattern and a method of producing the same.

BACKGROUND

A notebook personal computer (PC) generally has a main unit and a display unit. The main unit includes a housing accommodating a main board, and an upper wall constituting the housing provides a palmrest in front of a keyboard mounting portion. Recently, the palmrest is applied with a coating having a hairline pattern.

More specifically, for example, a resin layer (primer layer) to improve adhesion is provided on the surface of a metallic palmrest, and a resin layer containing powder of a brilliant material (brilliant resin layer) is provided thereon. The surface of the brilliant resin layer is applied with hairline finish. As a result of the hairline finish, the brilliant material in the brilliant resin layer may be exposed from the surface. Since the palmrest is contacted with the wrist or palm of the PC user, the exposed brilliant material gradually reacts with sebum from the wrist or palm of the user and deteriorates (for example, discolors) over time. To prevent the deterioration of the brilliant material, a clear coating is applied, as a protective layer, to the brilliant resin layer having the hairline finish applied thereon.

However, the addition of the step of a clear coating lowers production efficiency and increases the cost of coated articles.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1A, FIG. 1B and FIG. 1C are schematic cross-sectional views illustrating stepwise a method of producing a coated article having a hairline pattern according to an embodiment.

DETAILED DESCRIPTION

Figure 2:
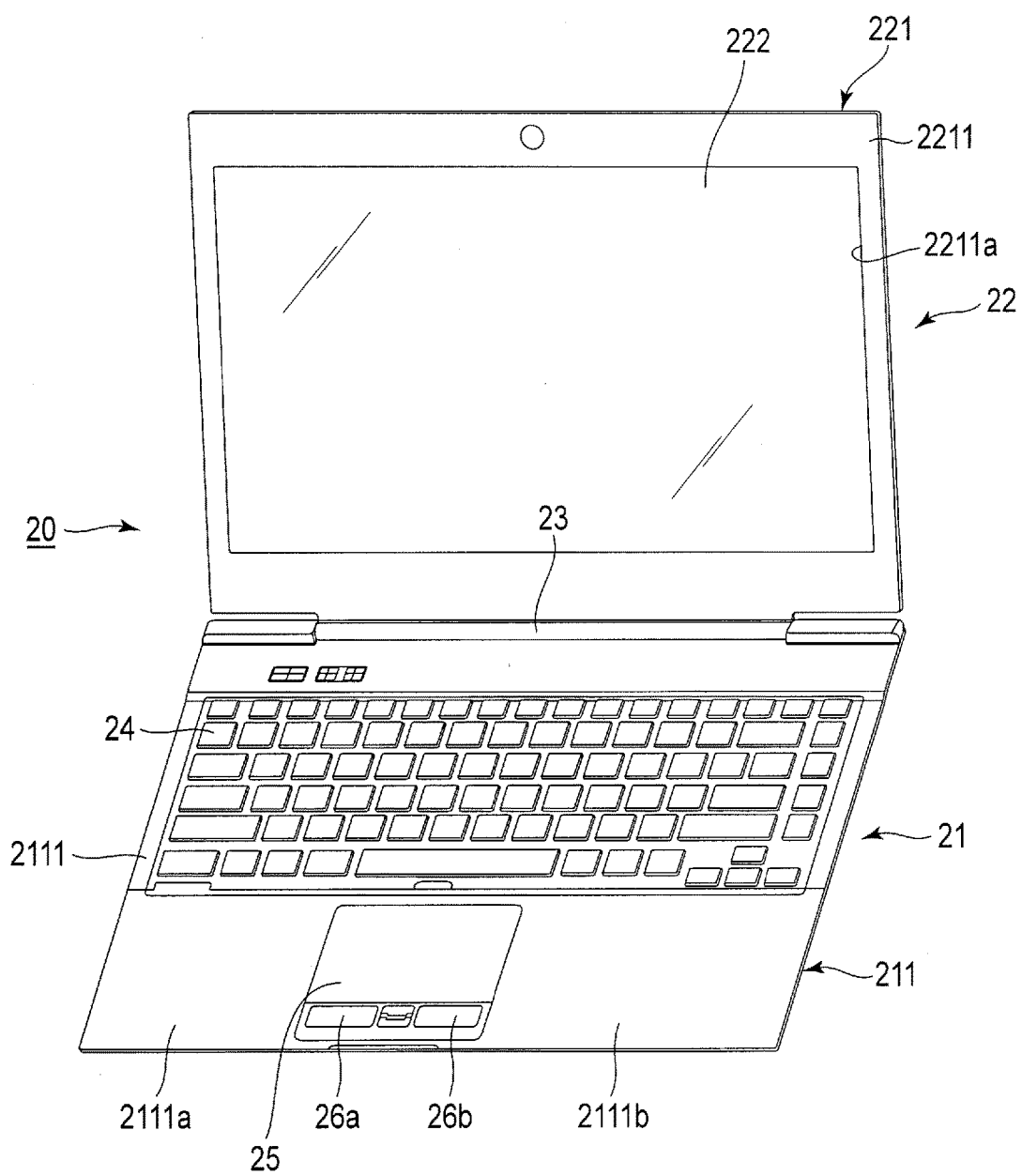
FIG. 2 is a perspective view illustrating an example of a notebook PC as a coated article having a hairline pattern according to an embodiment, with a display unit opened.

Various embodiments will be described hereinafter with reference to the accompanying drawings.

In general, according to one embodiment, a coated article having a hairline pattern comprises a base member having at least its surface region formed of a resin. A surface of the base member has a hairline pattern. A brilliant resin layer containing powder of brilliant material in the resin is provided on the surface of the base member having the hairline pattern.

In one embodiment, the base member comprises a metal substrate constituting the body of the article and a primer resin layer provided on the metal substrate. The surface of the primer resin layer has the hairline pattern. That is, the primer resin layer corresponds to the surface region mentioned above.

In another embodiment, the base member can constitute the body of the coated article.

Embodiments will be described hereinafter with reference to the drawings. The drawings are schematic and are not to scale.

FIG. 1A to FIG. 1C illustrate, in a stepwise manner, a method of producing a coated article according to an embodiment.

As illustrated in FIG. 1A, a primer resin layer 112 is provided on a metal substrate 111 constituting the body of a coated article. The metal substrate 111 can be formed of, for example, magnesium or an alloy thereof (for example, AZ91 alloy). The metal substrate 111 and the primer resin layer 112 provided thereon constitute a base member 11.

The primer resin layer 112 is to improve adhesion between the metal substrate 111 and a brilliant material-containing resin layer (brilliant resin layer) to be described later, and can be formed of, for example, an acrylic resin coating. The primer resin layer 112 can be formed by, for example, applying a primer resin coating more than once, for example, two or three times. The primer resin layer 112 may have a total thickness of, for example, 40 to 60 µm.

Next, as illustrated in FIG. 1B, a hairline finish is applied to the surface of the primer resin layer 112.

The hairline finish may be applied by, for example, rubbing the surface of the primer resin layer 112 in one direction with sandpaper or a wire brush.

By the hairline finish, a large number of narrow and shallow grooves 1121 (hairlines) are formed extending in one direction on the surface of the primer resin layer 112. The depth of each groove 1121 may be, for example, 1 to 5 µm. The length of each groove 1121 may be, for example, 20 to 30 mm. Thus, the surface of the primer resin layer 112 has a hairline pattern. In FIG. 1B, and also in FIG. 1C, the grooves 1121 extend in a direction orthogonal to the paper surface of the Figures.

Thereafter, as illustrated in FIG. 1C, a resin layer 12 containing powder 13 of a brilliant material in a resin (brilliant resin layer) is formed on the primer resin layer 112 having the hairline pattern 1121. A coated article 10 having the hairline pattern 1121 is thus produced. No coating is applied on the brilliant resin layer 12. That is, the brilliant resin layer 12 constitutes the outermost layer of the coated article 10.

The brilliant material is generally formed of a metal, and such metallic brilliant material is well known in the art. The metallic brilliant material may be formed of, for example, aluminum or an alloy thereof. Particles of the powder 13 include flakes, and the flakes include scaly flakes. That is, each particle of the brilliant material powder 13 may be a scaly flake.

The resin of the brilliant resin layer 12 is, for example, an acrylic resin.

The brilliant resin layer 12 may contain the brilliant material (powder) in an amount of, for example, 0.5 to 10% by weight. The brilliant resin layer 12 may have a thickness of, for example, 9 to 14 µm.

An acrylic resin-based coating containing brilliant material powder (metallic coating) for forming the brilliant resin layer 12 is known per se in the art, and is commercially available (for example, available from Origin Electric Co., Ltd. of Japan).

The surface of the brilliant resin layer 12 reflects the shape of the hairline pattern formed on the surface of the primer resin layer 112. That is, the surface of the brilliant resin layer 12 is not directly subjected to the hairline finish, but the surface shape of the primer resin layer subjected to the hairline finish is transferred to the surface of the brilliant resin layer 12.

In a preferable embodiment, the maximum size of each powder particle 13 of the brilliant material contained in the brilliant resin layer 12 is smaller than the thickness of the brilliant resin layer 12. The maximum size of each brilliant material powder particle 13 being smaller than the thickness of the brilliant resin layer 12 can prevent the brilliant material powder particles 13 from being exposed from the brilliant resin layer 12. As a result, deterioration (for example, discoloration) of the brilliant material can be significantly suppressed.

It should be noted that the maximum size of each powder particle corresponds to the maximum length of a straight line connecting two arbitrary points on the outline of the powder particle.

The maximum size noted above may be, for example, 5 to 12 μm.

In another preferable embodiment, each brilliant material powder particle is coated with a resin. The resin coating the brilliant material powder particles may be the same as the resin of the brilliant resin layer 12. In this case, too, the maximum size of each brilliant material powder particle is preferably smaller than the thickness of the brilliant resin layer 12 and may be, for example, 5 to 12 μm.

By coating the brilliant material powder particle with a resin, deterioration (for example, discoloration) can be effectively prevented, even if the powder particles are exposed from the brilliant resin layer, since the powder particles are protected by the resin. It should be noted that brilliant material powder coated with a resin is known per se and commercially available (for example, the Alpaste (registered trademark) PCF series available from Toyo Aluminium K.K. of Japan, which is resin-coated aluminum flakes.

In order for the metallic texture which the metal substrate 111 has to be felt, in other words, in order for the primer resin layer 112 and the brilliant resin layer 12 not to impair the metallic texture which the metal substrate 111 has, when the coated article 10 is viewed from the brilliant resin layer side, the primer resin layer 112 is preferably colorless and transparent, and also the resin of the brilliant resin layer 12 is preferably colorless and transparent. In this case, the amount of brilliant material powder contained in the brilliant resin layer 12 is preferably small within the above-described range. An acrylic resin is a representative example of the colorless and transparent resin.

According to an embodiment, a product comprising the coated article according to one or more embodiments described above is provided. The product includes an electronic device. The electronic device comprises a component that the user touches with the palm in operation, and the component may include the coated article according to one or more embodiments described above. Such an electronic device may be a notebook PC of which the main unit comprises a palmrest, and the palmrest may be constituted by the coated article according to one or more embodiments described above.

FIG. 2 is a perspective view illustrating an example of a notebook PC in which the coated article according to the embodiment is incorporated, with a display unit opened.

A notebook PC 20 illustrated in FIG. 2 comprises a main unit 21 and a display unit 22 openably and closably connected to the rear end of the main unit 21 by a hinge 23.

The display unit 22 comprises a display housing 221 constituted by a front wall 2211 and a back wall (not shown), and a display panel 222 accommodated in the display housing 221. The display panel 222 is exposed at a wide opening 2211a provided on the front wall 2211 of the display housing 221.

The main unit 21 comprises a housing 211 constituted by an upper wall 2111 and a lower wall (not shown), and a main board (not shown) is mounted inside the housing 211.

A keyboard 24 is mounted on the upper wall 2111 of the main unit 21. The portion of the upper wall 2111 on which the keyboard 24 is mounted (keyboard mounting portion) is recessed inside of the housing 211.

A portion of the upper wall 2111 in front of the keyboard mounting portion constitutes left and right palmrests 2111a and 2111b. Between the left and right palmrests 2111a and 2111b, a touchpad 25 is provided, which is operated by touchpad buttons 26a and 26b. The upper wall 2111 is integrally formed except the touchpad 25 and the buttons 26a and 26b.

The housing 221 of the display unit and the housing 211 of the main unit can be formed of magnesium or an alloy thereof (for example, AZ91 alloy).

Each of the palmrests 2111a and 2111b can have the structure illustrated in FIG. 10. Each of the palmrests has a structure where a primer resin layer (corresponding to the primer resin layer 112 in FIG. 1C) is formed on a palmrest portion of the upper wall 2111 (corresponding to the substrate 111 in FIG. 10) formed of magnesium or an alloy thereof. The surface of the primer resin layer is applied with a hairline finish, and consequently a hairline pattern (corresponding to the hairline pattern 1121 in FIG. 10) is imparted. On the primer resin layer, a brilliant resin layer (corresponding to the brilliant resin layer 12 in FIG. 10) containing brilliant material powder (corresponding to the brilliant material powder 13 in FIG. 10) formed of aluminum or an alloy thereof is provided.

Next, an Example will be described.

EXAMPLE

The upper wall 2111 constituting the housing 211 of the main unit of the notebook PC having the structure illustrated in FIG. 2 was formed of AZ91 alloy, and a primer resin layer having a thickness of 40 μm was formed on the palmrest portions of the upper wall 2111 by applying an acrylic resin coating (manufactured by Mirai Paint) twice and drying the coating. The surface of the primer resin layer was rubbed by a #320 rotary buff in a constant direction, forming a large number of grooves (hairlines) having a depth of 5 to 8 μm. A brilliant resin layer was formed on the primer resin layer having the hairline pattern by applying and drying an acrylic resin-based metallic coating (manufactured by Mirai Paint) containing aluminum flakes having a maximum size of 5 to 12 μm in an amount of 9.0% by weight.

The coated upper wall 2111 was thus produced.

The notebook PC of the structure illustrated in FIG. 2 was produced by the usual method except that the coated upper wall is used.

Since, in this Example, no clear coating was applied on the brilliant resin layer, the production could be efficiency carried out, the cost of a clear coating could be saved and the production lead time could be shortened. Furthermore, since a hairline finish was not applied to the brilliant resin layer, and the maximum size of each aluminum flake contained in the brilliant resin layer was smaller than the thickness of the brilliant resin layer, the aluminum flakes were not exposed from the brilliant resin layer. Therefore, it is expected that discoloration of the aluminum flakes will be significantly prevented over a long period of time.

According to these embodiments and the Example, no clear coating is applied, and therefore, production efficiency of the coated articles can be significantly improved, and the cost of producing the coated articles can be significantly reduced. Moreover, since a hairline finish is not directly applied to the brilliant resin layer, there are no brilliant material powder particles exposed from the brilliant resin layer by a hairline finish applied to the brilliant resin layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A coated article having a hairline pattern, comprising:
   a base member comprising a metal substrate constituting a body of the article and a primer resin layer provided on the metal substrate, the primer resin layer having the hairline pattern on its surface; and
   a brilliant resin layer provided on the surface of the primer resin layer in the base member and containing powder of a brilliant material in a resin,
   wherein the metal substrate is formed of magnesium or an alloy thereof.

2. The coated article of claim 1, wherein the powder of the brilliant material is formed of aluminum or an alloy thereof.

3. The coated article of claim 1, wherein each particle of the powder of the brilliant material has a maximum size smaller than a thickness of the brilliant resin layer.

4. The coated article of claim 3, wherein the brilliant resin layer has a thickness of 9 to 14 µm.

5. The coated article of claim 1, wherein the primer resin layer has a thickness of 40 to 60 µm.

6. The coated article of claim 1, wherein each particle of the powder of the brilliant material is coated with a resin.

7. A method of producing a coated article, comprising:
   providing a base member comprising a primer resin layer on a metal substrate constituting a body of the article;
   applying a hairline finish to a surface of the primer resin layer in the base member; and
   forming, on the surface of the primer resin layer applied with the hairline finish, a brilliant resin layer containing powder of a brilliant material in a resin,
   wherein the metal substrate is formed of magnesium or an alloy thereof.

8. The method of claim 7, wherein the powder of the brilliant material is formed of aluminum or an alloy thereof.

9. The method of claim 7, wherein each particle of the powder of the brilliant material has a maximum size smaller than a thickness of the brilliant resin layer.

10. The method of claim 9, wherein the brilliant resin layer is formed to a thickness of 9 to 14 µm.

11. The method of claim 9, wherein the primer resin layer is formed to a thickness of 40 to 60 µm.

12. The method of claim 9, wherein each particle of the powder of the brilliant material is coated with a resin.

13. A notebook personal computer comprising:
   a housing provided in a main unit and comprising a palmrest, the palmrest comprising a coated article,
   wherein the coated article comprising:
      a base member comprising a metal substrate constituting a body of the article and a primer resin layer provided on the metal substrate, the primer resin layer having the hairline pattern on its surface; and
      a brilliant resin layer provided on the surface of the primer resin layer in the base member and containing powder of a brilliant material in a resin, and
      wherein the metal substrate is formed of magnesium or an alloy thereof.

* * * * *